Nov. 25, 1958 R. G. POHL 2,861,932

METHOD OF TREATING SEMI-CONDUCTOR ARTICLES

Filed March 6, 1957

Inventor
Robert G. Pohl
by John J. Pederson
Attorney

United States Patent Office 2,861,932

Patented Nov. 25, 1958

2,861,932

METHOD OF TREATING SEMI-CONDUCTOR ARTICLES

Robert G. Pohl, Chicago, Ill., assignor to The Rauland Corporation, a corporation of Illinois Application March 6, 1957, Serial No. 644,389

3 Claims. (Cl. 204—141)

Figures 1, 2:
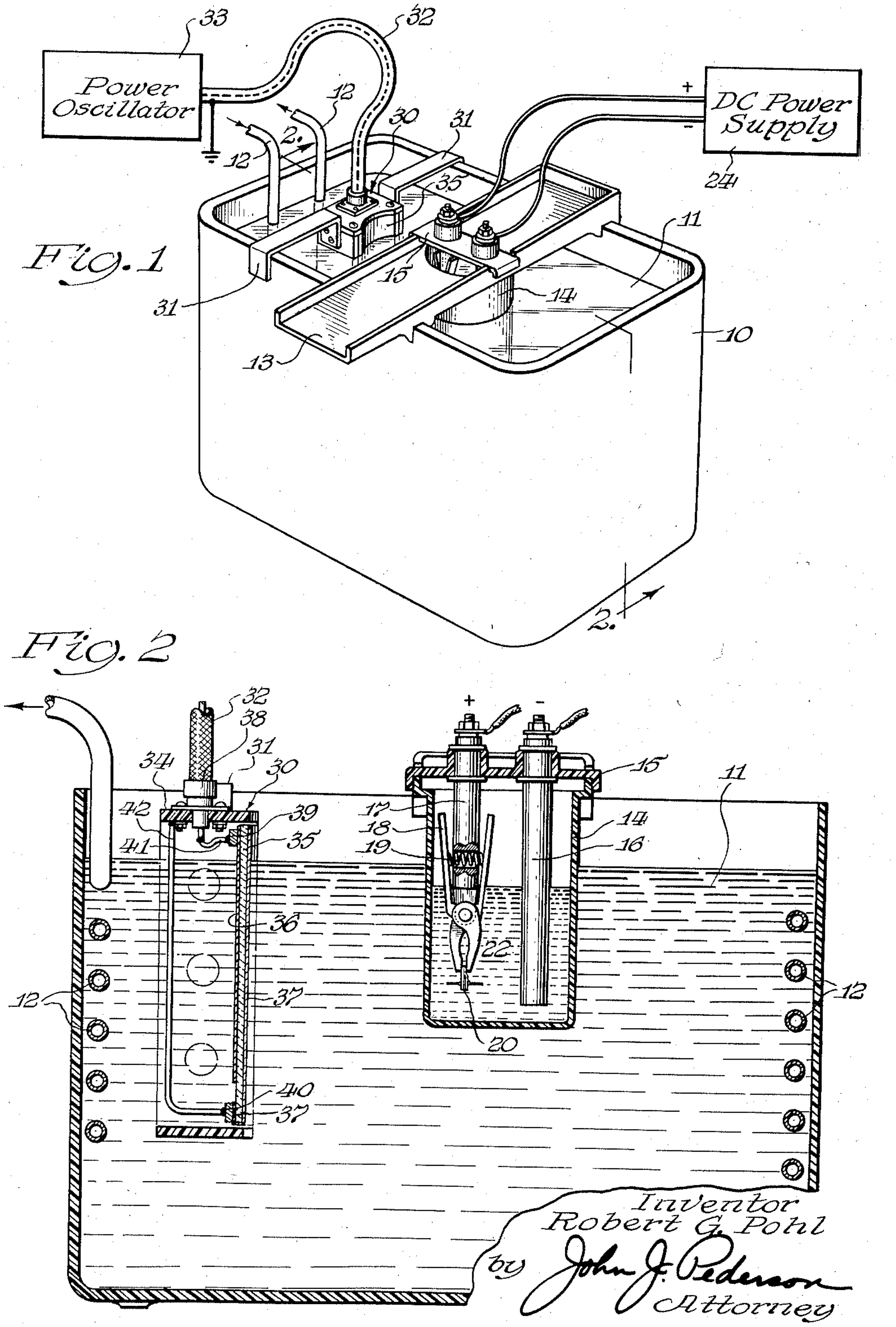

The present invention relates to the treatment of semi-conductors and particularly to a method of etching semi-conductor wafers and devices.

It is now conventional in the semi-conductor processing art to etch semi-conductor articles at various steps in the manufacture of a semi-conductor device. The wafer of semi-conductor material, such as germanium, which constitutes the body of a transistor device often is immersed in an etchant in order to clean it and to reduce the thickness of the wafer to a desired value. After the formation of electrode-junctions on the wafer, the unit again is immersed in an etchant for the purpose of cleaning and perhaps otherwise treating the surfaces of the device before it is encapsulated.

While various etchants have been utilized for these purposes, one well known chemical etchant is a fluid mixture including nitric acid, acetic acid, bromine, and hydrofluoric acid. Another approach taken in the prior art is to use an electrolytic etchant such as a weak sodium hydroxide solution; an electric current is caused to pass from the immersed article, be it the wafer alone or the finished assembly, through the etchant to a graphite electrode. This latter technique is particularly advantageous when etching a transistor assembly, because, by connecting the positive terminal of a power supply to the transistor, spurious metallic particles are caused to proceed toward the graphite electrode by electrolysis; such spurious metals are those conventionally utilized in the fabrication of the assembly and include tin, lead, antimony, nickel, iron, copper, stainless steel and indium, to mention a few. These metals have an adverse effect on the surface re-combination velocity of the wafer if they be permitted to be deposited thereon.

It has been found that, with either chemical or electrolytic etching, impurities detrimental to proper performance of the resultant device nevertheless remain on the semi-conductor surfaces. In one such prior art process, a white component, believed to be a germanium complex insoluble in the etchant, is observed to float to the surface of the etchant where it forms a scum. Upon removal of the treated article, this deposit adheres very tightly to the surfaces thereof and is extremely difficult to remove. Another disadvantage in these prior art processes stems from the fact that the temperature of the etchant in the immediate vicinity of the article being etched increases during the etching process; this in turn increases the activity of the etchant at that point, leading to non-uniform etching from one wafer to the next.

It is accordingly a general object of my invention to provide a method of processing semi-conductor articles which avoid the aforenoted deficiencies in prior art methods.

It is another object of my invention to provide a method of etching semi-conductor articles in which the etched article is substantially free of unwanted surface deposits.

It is a further object of my invention to provide a method of successively etching semi-conductor wafers in which thickness variation from one article to the next is minimized.

In accordance with the present invention, the semi-conductor article is immersed in an etchant while the latter is subjected to ultrasonic vibration. Further improvement is obtained, in accordance with another aspect of the invention, by passing an electric current from the immersed article through the etchant at the same time.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements and in which:

Figure 1 is a perspective view of apparatus useful in carrying out the method of the present invention; and Figure 2 is a cross-sectional view taken along line 2—2 in Figure 1.

A typical apparatus for carrying out the inventive method is illustrated in Figures 1 and 2 and includes a tank 10 which is substantially filled with a cooling bath 11 of de-ionized water of high resistivity (more than 100,000 ohm-centimeters). Cooling coils 12 are disposed in bath 11 around the inner circumference of tank 10 and conduct a coolant for the purpose of maintaining a substantially constant temperature, approximately 40° centigrade in the present example, within tank 10 during the etching process to be described. Bath 11 may have a volume of approximately two gallons.

Extending downwardly from a trough 13 into bath 11 is a polyethylene container 14 open at its top. A bracket 15 resting across the top of container 14 supports an electrode 16, preferably of high-purity graphite, which projects downwardly within the container. Bracket 15 also supports a copper rod 17 extending downwardly into container 14, affixed to the lower end of which is a platinum pincers 18 biased by a spring 19 to grip a semi-conductor article 20, which may for example be a germanium wafer or a completed but not yet encapsulated alloy junction transistor, and thereby suspend the latter in the lower portion of container 14 spaced from electrode 16.

Container 14 is at least partially filled with an etchant solution 22; in the instant example, approximately 50 cubic centimeters of etchant is utilized. Preferably, etchant solution 22 is a liquid mixture known in the art as $CP_4$; this mixture comprises acetic acid, nitric acid, bromine, and hydrofluoric acid. Although the proportions of these constituents may vary in accordance with the requirements of the individual user, a typical mixture which has been found to afford excellent results is, by volume, 27% glacial acetic acid, 44% concentrated nitric acid, 2% liquid bromine, and 27% hydrofluoric acid.

Rod 17 is connected to the positive terminal of a D. C. power supply 24, and electrode 16 is connected to the negative terminal of that supply. In the present embodiment of the invention, the potential applied across rod 17 and electrode 16 from supply 24 is approximately 45 volts; with the above etchant and with semi-conductor article 20 being spaced about one inch from electrode 16, a current of 200 milliamperes passes between the article and the graphite electrode.

Spaced from container 14 in bath 11 is an ultrasonic transducer 30 which is suspended from tank 10 by brackets 31; transducer 30, which may be entirely conventional, is coupled by a coaxial cable 32 to a power oscillator 33. Ultrasonic transducer 30 includes a Bakelite housing 34 which supports a transducing element 35, generally concave in shape and preferably of barium titanate ceramic prepolarized in its thickness direction. A silver coating 36 affixed to the side of transducer element 35 remote from container 14 extends from the top of the element to approximately one inch from the bottom thereof. Another silver coating 37 extends across the lower one-half inch of this same side of element 35, around the bottom end of the element, and over the face of the element opposite coating 36. Coaxial cable 32 is coupled through a conventional connector 38 to coatings 36 and 37. Secure electrical connections to the latter are obtained by first soldering copper strips 39 and 40 respectively to each of coatings 36 and 37. A wire 41 is then connected between strip 39 and the inner terminal of connector 38, while the external or ground portion of connector 38 is connected by a wire 42 to strip 40. Power oscillator 33 is entirely conventional. In the present instance, it operates at a frequency of 283 kilocycles at a power output of one kilowatt. The container 14 is positioned so that the semi-conductor article 20 is situated at the focal point of the concave transducer element 35.

In carrying out the new method of my invention, the article to be treated, article 20 illustrated in Figure 2 or any other semi-conductor article including simply a wafer of germanium, is clamped in pincers 18. Bracket 15 is then disposed across trough 13 so that both article 20 and electrode 16 are immersed within etchant 22. At the same time, power oscillator 33 is energized whereupon ultrasonic energy is transmitted into the water in bath 11 which in turn transmits the ultrasonic energy through the wall of container 14 into etchant 22. In operation, bath 11 and etchant 22 become extremely cloudy and vapor rises from the top surfaces of the liquids, giving an appearance as if the water and etchant 22 were boiling; actually, the coolant in coils 12 keeps bath 11 at about 40° C. in the typical embodiment described. Concurrently, power supply 24 is energized to pass electric current from article 20 through etchant 22 to electrode 16. Conventional current-flow direction is utilized for purposes of definition; that is, current flows from anodically- or positively-polarized article 20 through etchant 22 to negatively polarized electrode 16.

The combined effect of applicant's method, which includes, in the preferred embodiment, subjecting article 20 to concurrent chemical etching, electrolysis, and ultrasonic vibration, is to produce a cleaning and/or dissolving action on article 20 of a quality never before produced. The application of the ultrasonic energy to etchant 22 during the electrolysis and chemical etching has been found to yield tremendously improved results and consistencies. It is believed that the ultrasonic energy is effective not only because of simple agitation of the etchant but also because of the cavitation within the latter which occurs. The resultant vigorous molecular action in the etchant tends to prevent temperature rise in the immediate vicinity of article 20 whereby consistent results are obtained when a succession of articles are subjected to the inventive process. Moreover, an examination of the etched articles upon removal from the apparatus reveals that the finished surfaces are substantially completely free of those surface deposits which otherwise would adversely affect operation of the device and which are characteristic of prior known processes.

While a particular embodiment of the present invention has been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

I claim:

1. The method of processing a semi-conductor article in a liquid electrolytic chemical etchant of predetermined volume surrounded by a liquid cooling medium of substantially larger volume comprising the steps of: maintaining said liquid cooling medium at a substantially constant predetermined temperature; immersing said article in said liquid electrolytic chemical etchant; polarizing said immersed article anodically to pass an electric current from said article through said electrolytic chemical etchant; and during passage of said electric current imparting to said etchant ultrasonic energy at a cavitation frequency.

2. The method defined in claim 1 in which said ultrasonic energy is imparted to said etchant through said cooling medium.

3. The method defined in claim 2 in which said cooling medium has a resistivity in excess of 100,000 ohm centimeters.

References Cited in the file of this patent

UNITED STATES PATENTS 2,656,496 Sparks ---------------- Oct. 20, 1953

OTHER REFERENCES

"Plating," vol. 42, November 1955, pp. 1407–1411.